July 6, 1926. 1,591,206

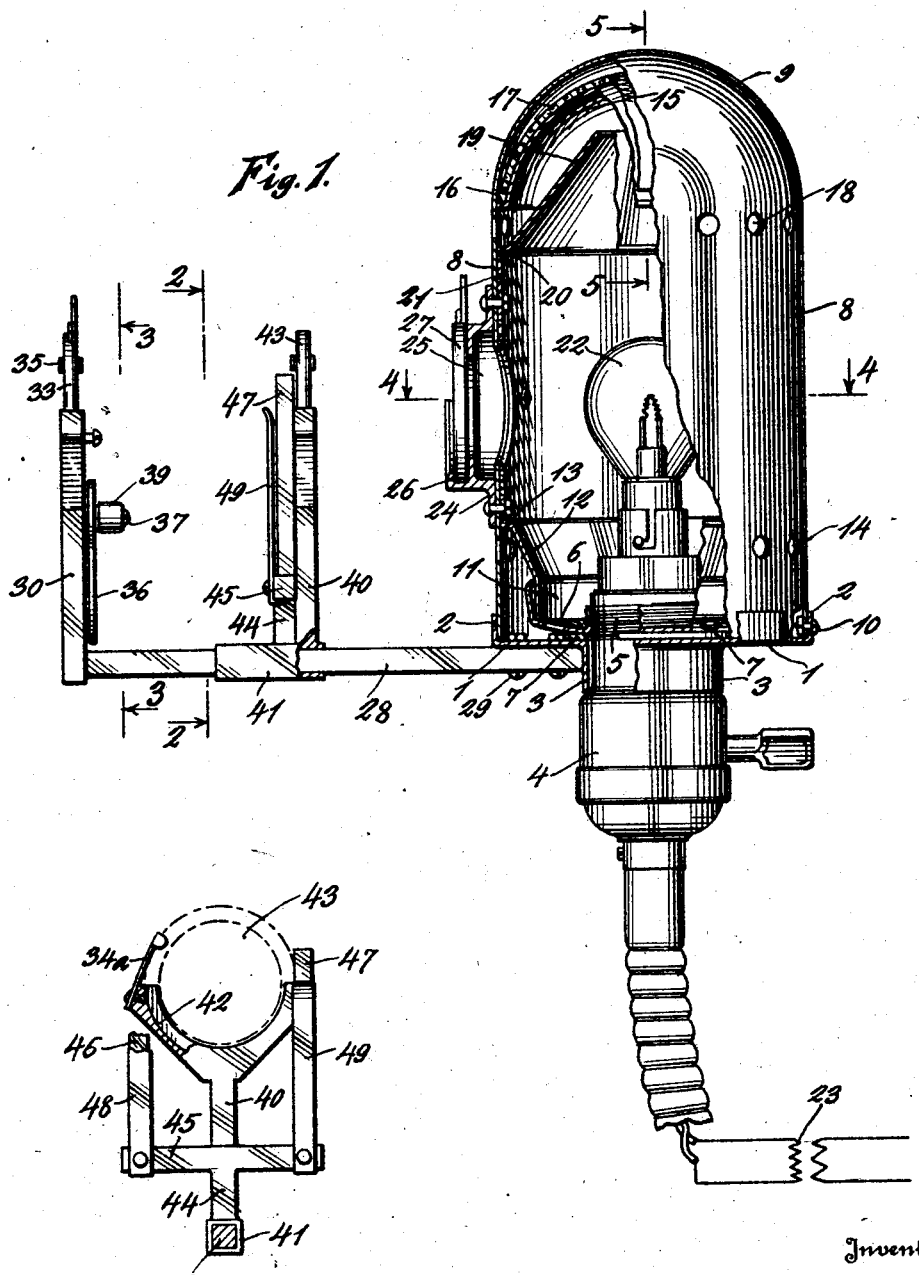

H. L. BAUM ET AL

OCULIST'S LAMP

Filed Nov. 10, 1925  2 Sheets-Sheet 2

Inventors
Harry L. Baum,
James M. Shields.
By A. J. O'Brien
Attorney

Patented July 6, 1926.

1,591,206

UNITED STATES PATENT OFFICE.

HARRY L. BAUM AND JAMES M. SHIELDS, OF DENVER, COLORADO, ASSIGNORS TO PAUL V. MUCKLE AND COMPANY, OF DENVER, COLORADO, A CORPORATION OF COLORADO.

OCULIST'S LAMP.

Application filed November 10, 1925. Serial No. 68,045.

This invention relates to improvements in oculists' lamps.

It is the object of this invention to produce a lamp that shall be especially well adapted for use by oculists for the examination of the eye and which may also be employed for many other purposes where a strong, directed beam of light is desired as, for example, in projecting upon a screen slide showing histological sections.

The lamp forming the subject of this invention, is especially well adapted for the following uses:

(1) For producing oblique illumination for the purpose of examining the anterior segment of the eye for the presence of foreign bodies and changes due to disease, by using either white or red-free light.

(2) For producing the necessary white or red-free light for retinoscopy.

(3) For furnishing the necessary light for ophthalmoscopic examinations.

(4) For centric retinoscopy or retinoscopy with a minute aperture.

(5) For furnishing an even white light, without filament shadow, for surgical operations, and (6) For the projection of histological sections.

Another object of this invention is to produce a lamp house that shall be so constructed as to be light tight and at the same time be so well ventilated that its outer surface will remain comparatively cool.

A further object is to produce a lamp of this type that employs the regular optician and oculist's trial lens and thereby makes it possible for the owner to produce any desired beam of light without necessitating the expenditure of further money for special lenses.

The above and other objects that may appear as the description proceeds are attained by a construction that will now be described in detail, reference for this purpose being had to the accompanying drawings in which the invention has been illustrated in its present preferred form and in which:

Fig. 1 is a side elevation of the improved lamp with parts thereof broken away to better disclose the construction;

Fig. 2 is a view of the movable support that carries the ray filter and the slides, a portion thereof being shown in section;

Figure 3:
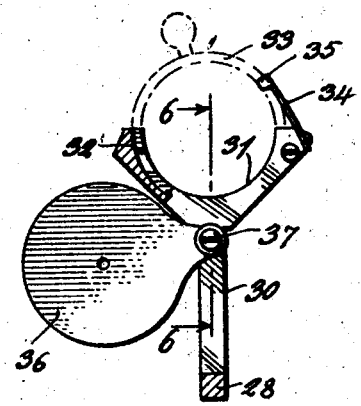
Fig. 3 is a view taken on line 3—3, Fig. 1, and shows the bracket for supporting the objective lens, parts thereof being shown in section.
Figure 4:
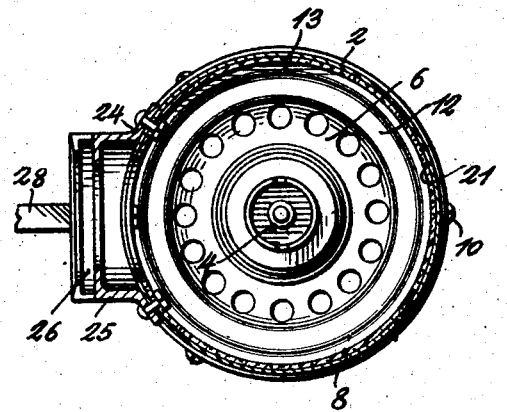
Fig. 4 is a transverse section of the lamp housing looking in the direction of the arrows 4—4, in Fig. 1.
Figure 5:
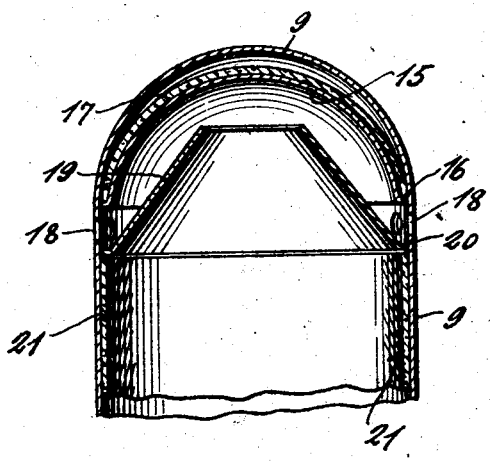
Fig. 5 is a section through the upper end of the housing, taken on line 5—5, Fig. 1.
Figure 6:
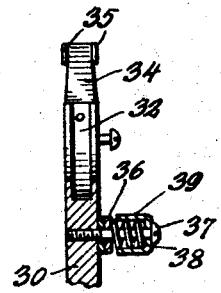
Fig. 6 is a section taken on line 6—6, Fig. 3.

Referring now to the drawings, numeral 1 represents the bottom of the lamp housing. This member is circular and has its outer edges 2 bent upwardly at right angles so as to form a flange and is provided with a central opening surrounded by the integral downwardly projecting flange 3 which receives the upper end of a lamp socket 4 that has a threaded portion 5 to which the clamping ring 6 is connected. A spacer ring 7 separates the lower surface of the clamping ring 5 from the upper surface of the base 1. A cylindrical housing 8 having a semi-spherical integral end 9 has an outer diameter substantially the same as the interior diameter of the flange 2. The open end of member 8 fits inside of the flange 2 and is held in place by short bolts 10. A baffle ring having a cylindrical portion 11, a conical part 12 and an outwardly extending flange 13, has its cylindrical portion extending downwardly into the interior of the clamping ring 6 and the periphery of the flange 13 in contact with the interior of the housing 8 directly above the circular row of openings 14. Secured to the interior of the housing 8 is a semi-spherical member 15 whose edge is turned outwardly so as to form a flange 16. An asbestos lining 17 separates the outer surface of member 15 from the inner surface of the spherical end surface 9. A row of holes 18 extends around the housing directly below the flange 16. A conical baffle 19 has an outwardly projecting flange 20 that is secured to the interior of the housing; this baffle is open at the top so as to permit air to pass from the interior and out through holes 18. The inner surface of the housing between flanges 13 and 20 is lined with asbestos board 21. A lamp 22 is connected to the socket 4 and receives current from the transformer 23. When the lamp is burning it generates a large amount of heat; this would very soon raise the temperature of the housing so high that it would be uncomfortable to come in contact with it. Air will enter the housing through openings 14 pass downwardly underneath the clamping ring 6 and through the holes in this and thence upwardly passing through the opening in the top of the baffle 19, thence downwardly and out through the holes 18. This circulation of air carries away the greater amount of the heat generated. The air passages and openings are so arranged that no light can leave the housing which is absolutely light proof and at the same time well ventilated. The housing has an opening on one side and has secured to the outside thereof a small casting or stamping 24 which has an opening 25 that is in alignment with the opening in the housing. A semi-circular groove 26 extends about the lower half of the opening 25 and is adapted to receive and hold the condenser lens 27 which may be an ordinary trial lens. A square rod or slide 28 is secured to the bottom 1 by means of screws 29 and to the outer end of this the bracket 30 is connected. The upper end of this bracket has a semi-circular notch 31 surrounded by a groove 32 which is adapted to receive the objective lens 33 that has been indicated by broken lines and which, like lens 27, is an oculist's trial lens. A spring 34 is fastened to one arm of the bracket 30 and has two fingers 35 that embrace the edge of the lens and holds the same in place. An apertured disk 36 is pivoted to the bracket by the screw 37 and can be swung from the position shown in Fig. 3 to a position in front of the lens 33. A spring 38 enclosed in a housing 39 puts pressure on the disk and serves to provide the required amount of friction to hold it in adjusted position. The posterior surface of this disk is painted black so as to prevent the reflection of the light rays. Mounted so as to be freely slidable along the rod 28 is a bracket 40 that projects upwardly from the sleeve 41. This bracket is substantially identical in construction with the bracket 30 that has just been described. The semi-circular groove 42 is intended to receive a Wratten gelatin light filter 43 of such color and consistency that it permits all but the red rays to pass through and which therefore makes it possible to obtain a red-free light which is useful for many purposes. A spring 34ª of the same size and shape as the corresponding spring in Fig. 3 holds the filter in place. Secured to the sleeve 41 directly in front of the bracket 40 is a vertical standard 44 which terminates in a transverse arm 45 from the ends of which the vertical standards 46 and 47, which are slightly thinner than the arm 45, extend upwardly (Fig. 1).

Secured to arm 45 directly in front of the vertical standards 46 and 47 are springs 48 and 49, the purpose of which is to provide means for holding a microscopic slide in place so that it may be adjusted to the proper position for projection. By selecting the proper lenses, 27 and 33, the lamp may be employed as a projector for the purpose of projecting histological sections onto a screen. The focusing is accomplished by sliding the brackets 40 and 44 along the guide 28.

One important advantage of the construction above described is that the condenser lens will not fog; this is due to the fact that the lamp housing is so thoroughly ventilated that the condensation of moisture will not take place on the lens.

It is evident to any one versed in the science of optics that by employing different kinds of lenses as the condenser (27) or objective (33) that the rays of light from the lamp 22 may be formed into beams having parallel, convergent or divergent rays.

This lamp can be used for many different purposes, the principal ones being those enumerated above. It is not our object to give detailed directions for the use of this lamp, as this belongs more properly to the instructions that accompany the device.

The construction described above and shown on the drawings is particularly well adapted for the purposes for which it is intended as it is of a pleasing design and so constructed that it is entirely light proof and at the same time well ventilated. The lens supporting brackets have been designed with the particular object in view of employing in combination therewith the ordinary oculist's trial lens as this makes it possible for an oculist to obtain, without additional expense, almost any conceivable combination. The perforated disk 36 is employed in centric retinoscopy as well as for other purposes where a small beam of light is necessary.

Having now described the invention what is claimed as new is:

1. In an oculist's lamp, in combination, a circular base member having its outer edge formed into a cylindrical flange, said base having a central opening, a lamp socket in said opening, a clamping ring for holding said socket in place, a housing member secured at one end to the flange on the base and having its other end closed, said housing member having a row of openings near its upper end and another row near its lower end and baffle members of conical shape secured to the interior surface of the housing intermediate the said rows of openings, the conical portions of said baffles extending across said row of openings so as to prevent light from passing out from the housing through said rows of openings.

2. A lamp housing for use in the examination of eyes, comprising, in combination, a circular base member having its edges turned so as to form a cylindrical flange, said base having a central opening whose edges are formed into a cylindrical flange, a lamp socket in said opening, a clamping ring secured to the lamp socket, said ring having an annular portion provided with a row of holes the outer edge of said ring extending at right angles to the bottom of the ring so as to provide an upwardly extending flange, a conical baffle member having its smaller end terminating in a cylindrical portion adapted to extend down into the clamping ring and having its larger end formed into an outwardly projecting flange adapted to engage the inner surface of the housing, said housing having a row of holes below the flange of the conical member, a second conical member secured to the inner surface of the housing near the upper end thereof, said housing having another row of holes above the line where the upper cone is connected to it and a lamp in said socket.

In testimony whereof we affix our signatures.

HARRY L. BAUM.
JAMES M. SHIELDS.